United States Patent [19]

Buswell et al.

[11] Patent Number: 4,740,357
[45] Date of Patent: Apr. 26, 1988

[54] RADIATION SHIELD FOR REFORMER APPARATUS

[75] Inventors: Richard F. Buswell; Roger C. Emanuelson, both of Glastonbury, Conn.

[73] Assignee: International Fuel Cells, So. Windsor, Conn.

[21] Appl. No.: 879,250

[22] Filed: Jun. 27, 1986

[51] Int. Cl.$^4$ .............................................. B01J 7/00
[52] U.S. Cl. .............................. 422/197; 48/196 A; 165/134.1; 422/312
[58] Field of Search .................. 422/197, 240, 312; 165/134.1; 48/93–95, 105, 214 A, 196 A

[56] References Cited

U.S. PATENT DOCUMENTS

| | | | |
|---|---|---|---|
| 2,085,041 | 6/1937 | Reigant et al. | 165/134.1 |
| 2,146,352 | 2/1939 | Rohrer | 165/134.1 |
| 3,171,389 | 3/1965 | Throckmorton | 165/134.1 |
| 3,507,449 | 4/1970 | Butter | 165/134.1 |
| 4,098,587 | 7/1978 | Krar et al. | 422/197 |
| 4,098,589 | 7/1978 | Buswell et al. | 422/197 |

OTHER PUBLICATIONS

"Fuel Processor Development for 11-MW Fuel Cell Power Plants", EPRI, Project 1771-1, EPRI EM 4123, Jul. 1985.

Primary Examiner—Barry S. Richman
Assistant Examiner—W. R. Johnson
Attorney, Agent, or Firm—Gene D. Fleischhauer

[57] ABSTRACT

A reformer apparatus 8 has a heat shield 17 for a reformer duct 16. Various construction details which increase the durability of the heat shield are developed. In one embodiment, the heat shield includes a plurality of rings 82 which are axially and circumferentially segmented, the rings being supported by a platform on which the stack of rings rests. At least one of the rings has a pair of segments each of which has a V-shaped identation in the end which receives a V-shaped projection of the adjacent segment leaving a circumferential gap between the segments which does not extend radially between the segments of the ring.

11 Claims, 2 Drawing Sheets

RADIATION SHIELD FOR REFORMER APPARATUS

TECHNICAL FIELD

This invention relates to an apparatus for reforming fuel, such as an apparatus for producing product gas from a hydrocarbon feed stock, and more particularly, to a heat shield for a reformer tube of such an apparatus.

BACKGROUND ART

A catalytic reformer apparatus is used, for example, in fuel cell power plant systems to produce a hydrogen fuel gas from a hydrocarbon fuel for use in a fuel cell. One method of producing the hydrogen is through steam reforming. In steam reforming, steam and the hydrocarbon fuel are passed over catalyst beds which are disposed in reformer tubes.

Because the reaction is endothermic, the reformer tubes are disposed within a burner gas region which includes burner cavity where fuel is burned to provide heat to the reformer tubes. The tubes are exposed to and receive heat from heated gases and from walls bounding the burner cavity.

One example of such a construction is shown in U.S. Pat. No. 4,098,587 issued to Krar et al. which is commonly assigned to the assignee of this application and was previously assigned to a predecessor in interest of the present assignee. As shown in FIG. 3 of Krar, the reformer tube is provided with a shield which is disposed about the reformer tube to prevent the tubes from receiving excessive radiant heat from the gases in the burner cavity and from the walls of the cavity. This more evenly distributes heat among and around all of the reformer tubes permitting the reformer tubes to be closely packed within the cavity and reducing temperature differences between reformer tubes.

The sleeves in Krar may be made from either a low thermally conductive material (insulating material), such as a ceramic, or thermally conductive material, such as stainless steel. Krar notes that while the best shielding is provided by low thermally conductive material, thermally conducting material can also provide good shielding. The sleeve may fully or only partially surround the tube and may have slots or other openings and cutouts which control the flow of burner cavity gases around the tubes.

As shown in FIG. 3 of Krar, the shield fits over the top of the reformer tube and surrounds the upper length of that portion of the reformer tube which is disposed in the hottest environment of the reformer. The opening in the side of the shield achieves a more uniform, circumferential temperature distribution about the reactor and permits some hot gas flow between the shield and the reformer to provide the necessary heat for the reformer.

With state of the art reformers being operated at higher and higher temperatures, cracking occasionally occurs in such shields leading to the possibility of sections falling out and resulting in local overheating and tube failure even when fibrous or castable ceramic materials are used for the shield. Accordingly, scientists and engineers are seeking to develop radiation shields having satisfactory durability even at elevated temperatures.

DISCLOSURE OF THE INVENTION

This invention is predicated in part on the recognition that axial and circumferential temperature gradients in the shield may cause stresses, particularly hoop and longitudinal stresses which when coupled with tensile stresses in the material, can exceed the fatigue life of the material.

According to the present invention, the heat shield for the hot end of a reformer duct includes a plurality of individual segments which extend laterally and longitudinally about the duct and which are stacked on a support to minimize tensile stresses in the segments.

In one detailed embodiment, the radiation shield is a ceramic material extending circumferentially about a reformer tube, the shield being formed of a plurality of axially spaced rings which are circumferentially segmented leaving a circumferential gap between segments and radially spaced from the tube leaving an annular gap therebetween.

A primary feature of the present invention is a heat shield for a reformer tube. The heat shield is formed of a plurality of individual segments which extend laterally and longitudinally about the reformer duct. In one embodiment, the reformer duct is a cylinder-like reformer tube. The heat shield is formed of a plurality of rings. Each ring is formed of a plurality of segments. In one embodiment, the segments may have slots or holes through the side of the ring to provide communication between the interior and the exterior of the ring. Another feature is the support means for the ring which minimizes tensile stresses in the ring by supporting the rings through stacking the rings on a support, such as a platform extending from the reformer. Another feature is the alignment of the gaps between circumferentially adjacent segments and the adjacent ring such that the gaps are either aligned or not aligned to tailor the flow of gases axially along and through the shield while minimizing radiation from the exterior of the shield to the reformer tube.

A primary advantage of the present invention is a reformer which can operate at elevated temperatures with a heat shield that has a good structural integrity in such an environment. Another advantage is a reformer having a compact spacing of reformer tubes which results from reducing temperature gradients in the tubes due to the location of the tubes within the reformer. Another advantage is the reformer efficiency which results from protecting tube surfaces from excessive radiant heat while more uniformly distributing heat from tube to tube and circumferentially around each tube as with prior heat shields which were axially and nearly circumferentially continuous. Another advantage is the structural integrity of the heat shield in the severe thermal environment of the reformer which results from reducing hoop stresses and other stresses in the shield by segmenting the shield in both the circumferential and axial directions to reduce stresses resulting from thermal gradients in the axial and circumferential directions and to reduce tensile stresses resulting from the support system.

The foregoing features and advantages of the present invention will become more apparent in light of the following detailed description of the best mode for carrying out the invention and in the accompanying drawings.

BEST MODE FOR CARRYING OUT THE INVENTION

Figure 1:
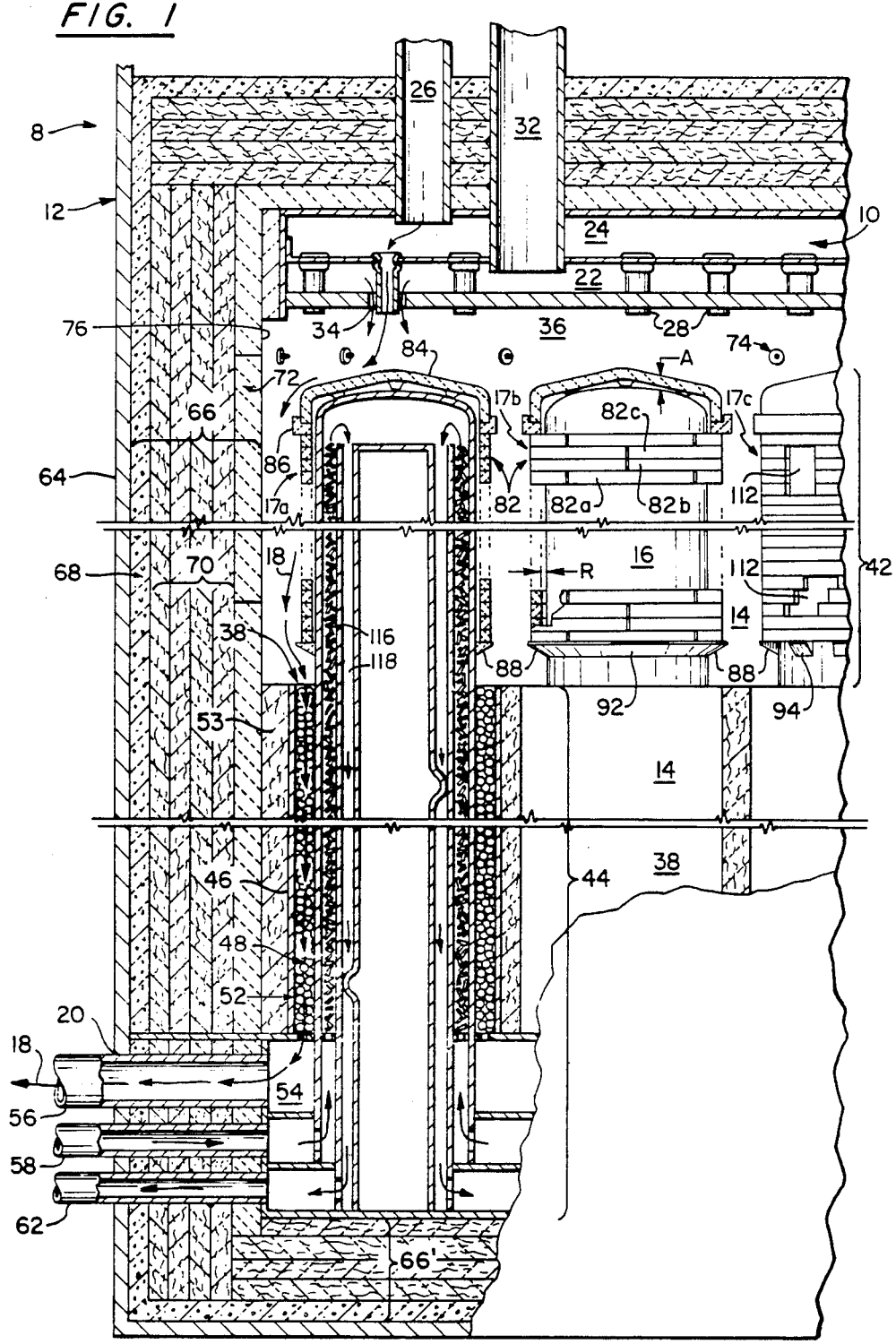
FIG. 1 is a side elevation, cross sectional view of a reformer apparatus which is partially broken away for clarity.

FIG. 1 shows an apparatus 8 for reforming a hydrocarbon fuel. The apparatus includes a burner 10 and a reformer pressure vessel 12. The reformer pressure vessel has a burner gas region 14 for receiving burner gases from the burner. A plurality of closely packed reformer ducts, as represented by the reformer tube 16, are disposed in the burner gas cavity. Heat shield means, such as the heat shield 17 represented by heat shields 17a, 17b and 17c, is disposed about at least one of the reformer tubes. The heat shield is spaced both radially a distance R and axially a distance A from the reformer tube. A flow path 18 for burner gases extends through the burner and through the burner gas region 14 over and around the heat shield and the reformer tubes, and thence through an opening 20 in the reformer pressure vessel to the exterior of the reformer.

The burner 10 includes an air manifold 22 and a fuel manifold 24. The fuel manifold is in flow communication with a source of fuel (such as an exhaust stream from a fuel cell stack—not shown) through the fuel inlet duct 26. A plurality of burner nozzles 28 extend from the fuel manifold 24 to the burner gas region 14. The air manifold 24 is in flow communication with a source of air (not shown) through the air inlet duct 32. An annular passageway 34 for air surrounds each burner nozzle. The annular passageway supplies air from the air manifold to the burner gas region 14 where the air is mixed with the fuel.

The burner gas region 14 includes a burner cavity 36 and a heat transfer region 38. As used herein, burner cavity means the volume of the gas region within which the actual combustion occurs. The reformer tube has an upper portion 42 and a lower portion 44. The upper portion is disposed in the burner cavity and shielded by the heat transfer shield from radiant heat transfer. The lower portion 44 extends from the upper portion and is disposed in the heat transfer region 38.

The heat transfer region 38 includes a circumferentially extending sleeve 46 spaced radially from the reformer tube to define a burner gas passageway 48. The passageway is filled with a heat transfer enhancement medium 52 such as a plurality of ceramic spheres. A blanket of ceramic fiber insulation 53 extends circumferentially about the sleeve to provide local insulation to the reformer tube.

A manifold 54 receives the burner gases and supplies the gases to a conduit 56 extending through the opening 20 for ducting the burner gases to the exterior of the reformer. A conduit 58 provides a means for supplying process fuel to the reformer tube and a conduit 62 provides a means for ducting the reformed fuel from the reformer tube. All three of these conduits extend through the reformer pressure vessel to the exterior of the reformer pressure vessel.

The reformer pressure vessel includes a wall 64 for containing the pressurized gases. The wall is in heat transfer communication with the flow path for burner gases. An insulation system 66, as represented by three layers of different types of insulation 68, 70, 72, is disposed between the wall and the location of the flow path for burner gases in the burner gas region 14. A plurality of pin assemblies extend through the insulation system to the wall 64 to aid in fixing the insulation system to the wall 64. The interior face 76 of the layers of insulation is part of an inner wall that will radiate heat received from the burner gases to the heat shield disposed about the reformer tube.

As shown in FIG. 1, the heat shield 17 includes a plurality of rings 82 stacked one upon the other. Each ring extends circumferentially about the reformer tube and is spaced radially from the reformer tube leaving a radial gap R therebetween. Each heat shield may also include a conical cap 84. The conical cap may be one piece or segmented. If the cap is segmented, or if the cap is expected to segment during operation, the top most ring is adapted by a circumferentially extending lip 86 to receive the cap.

The reformer has a support means 88, as represented by the platforms 92, 94, which positions each plurality of rings about the associated reformer tubes. The platform may extend from any convenient structure in the reformer. As shown, the platform may extend circumferentially continuously about the reformer tube, as does the platform 92, or consist of local lugs 94 which extend axially and radially from the reformer tube. In both examples, the platform provides a base which is engaged by one of the rings and on which the remaining rings are stacked and supported. Each ring in turn is stacked on the next lower ring with the lower ring providing a base, such as the base 82a, which supports the upper ring 82b. Accordingly, each base provides a stackable support for a ring and the base relies on an element of the reformer apparatus for support.

Figure 2:
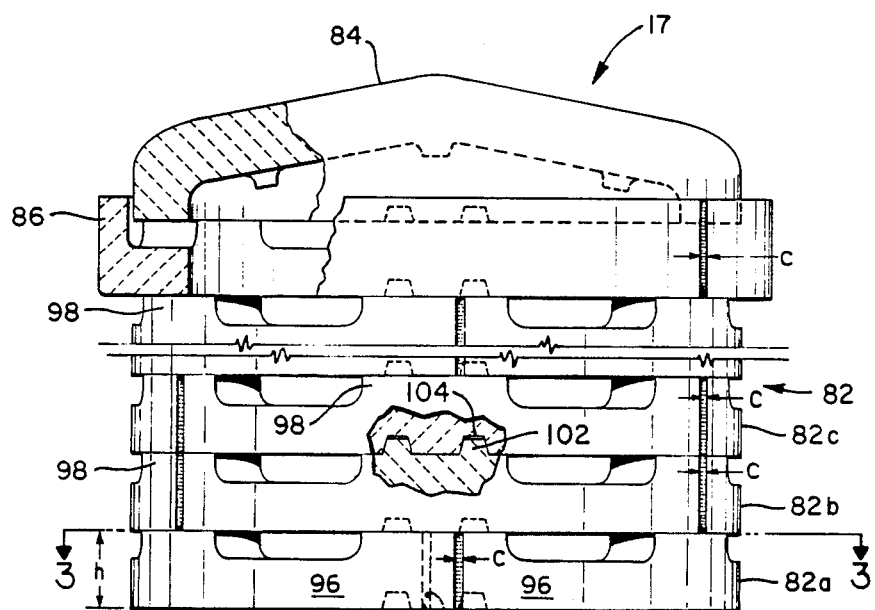
FIG. 2 is a cross sectional view of a heat shield taken along the lines 2—2 of FIG. 1, with the outline of the reformer shown in phantom for clarity.

FIG. 2 is a side elevation view of a plurality of axially adjacent rings 82. Each ring is formed of a plurality of (that is, two or more) circumferentially extending segments 96. Each segment is spaced circumferentially from the adjacent segment leaving a circumferential gap C therebetween. Each segment has at least one projection 98 on the segment which engages the axially adjacent ring. The projection axially spaces the adjacent ring from the segment. The projection may also include a locating dimple 92, which may be semi-spherical or conically shaped. The locating dimple engages a similarly shaped locating recess 104 in the axially adjacent ring. The conically shaped projection is preferred in case significant differences in circumferential thermal expansion occur between one segment and the axially adjacent segment. If such expansion occurs, the expansion can be accommodated by one of the rings moving axially with respect to the other ring as it rides up or down the conical surface.

Figure 3:
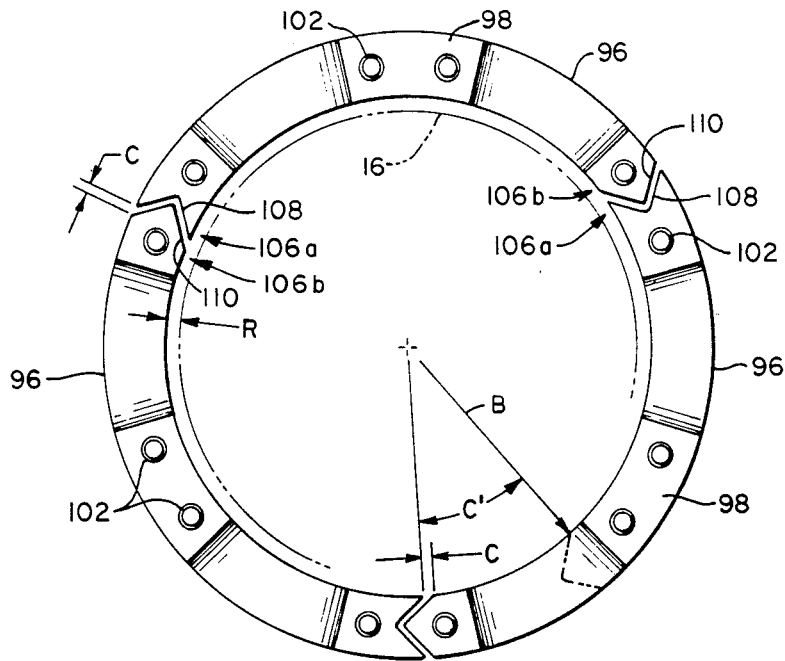
FIG. 3 is a side elevation of the heat shield shown in FIG. 2.

FIG. 3 is a view taken along lines 3—3 of FIG. 2 showing a base ring 82a (corresponding to the ring 82a of FIG. 1) and the relationships of the circumferentially extending segments 96 to each other. As shown in this particular embodiment, each pair of segments has facing ends 106a, 106b. One of the ends has a V-shaped indentation 108 in the end. The ehd of the other segment has a V-shaped projection 110 at the end which extends into the V-shaped indentation and beyond the end of the adjacent segment. The relationship between 108 and 110 is shown by dotted lines at one location in FIG. 2 and omitted at the other locations for clarity. This leaves a circumferential gap C therebetween which does not extend radially between the rings. The tortuous flow path can be used to limit flow through the ring at this location and through the radial gap R adjacent to the reformer tube 16. Alternatively, the ends of the rings may be widely spaced apart such that the segment terminates at the location shown in phantom in FIG. 3 leaving a much larger gap C' therebetween. As shown, each ring is formed of at least two segments to decrease the hoop stress in the ring and the height of each ring is less than one-third the radius B of the ring to further decrease the axial stress gradient in the rings. As will be realized, the axially and circumferentially segmented ring design provides great latitude in tailoring the heat transfer from the wall 76 and the burner gases to the reformer tube without introducing stress concentrations into the portions of the ring.

For example, the length of the segments and the circumferential gaps may be adjusted as shown in FIG. 1 for the rings which form the heat transfer shield 17c such that holes extend through the segments of the ring. The circumferential gap C may be aligned (rings 82b and 82c) or may be displaced with respect to adjacent rings (82a and 82b) to interrupt the axial flow of gases along the heat shield.

Experiments have been performed using a ceramic insulating material, such as aluminum oxide or zirconium oxide, in dense cast form. Slightly better results in terms of long term structural integrity were obtained using the zirconium oxide. One commercially available source of such material is the Ispen Corporation, Rockford, Ill. which supplies such material as I-Cor 921 material.

During operation of the reformer apparatus shown in FIG. 1, air and fuel are flowed via the fuel inlet duct 26 and the air inlet duct 32 to their respective manifolds. The air and fuel are flowed thence into the burned cavity 36 where the gases are burned to produce heat for the reformer reaction. The gases flow along the flow path 18 for burner gases over the heat shields 17a, 17b, and 17c for the reformer tubes 16 and through the burner gas passages 48 surrounding the reformer tubes. The burner gases are exhausted from the reformer apparatus via the exhaust manifold 54 and the burner gas exhaust conduit 56. Process fuel is supplied to each reformer tube via the supply conduits 58 and thence through manifolds (not shown) to the tubes. The process fuel flows upwardly through an outer passage 116 filled with catalyst where it is reformed. The heated, reformed fuel is then flowed downwardly through an inner passage 118 which regeneratively heats the fuel flowing upwardly in the passage 116 of the reformer tube. The reformed fuel is ducted from the reformer tube via the conduit 62.

As the gases are burned in the burner cavity and flowed along the flow path 18 for burner gases, the burner gases radiate heat to the heat shields 17a, 17b, and 17c. The heat shields block radiation from the walls and the gases to the reformer tube. The openings and spacings between rings 82 between the reformer tube 16 and the adjacent rings and between the segments of each ring more uniformly distribute heat from tube to tube and circumferentially around each tube than if the heat shields were not present. The ultimate object as with prior art heat shields, is to have each tube see the same heating environment as every other tube so that wall temperatures are uniform from tube to tube at the same axial location and circumferentially around each tube. This reduces maximum tube wall temperatures thereby increasing tube life expectancy, and also may improve the reformer thermal efficiency.

Testing has shown that segmenting the rings improves the structural integrity of the heat shield and does not adversely effect the ability of the heat shield to perform its intended function in maintaining relatively uniform temperatures in the reformer. Moreover, using a support system which places the shield in compression reduces harmful tensile stresses in the ring of ceramic material while increasing the less harmful compression stresses in the rings.

Although the invention has been shown and described with respect to detailed embodiments thereof, it should be understood by those skilled in the art that various changes in form and detail thereof may be made without departing from the spirit and the scope of the claimed invention.

We claim:

1. An apparatus for reforming a fuel which comprises:
    A. a means for providing heat for an endothermic reaction including a burner gas region having a burner cavity and a heat transfer region, the means including means for introducing and burning fuel in the burner cavity to produce hot gases and means for exhausting the hot gases from the burner gas region;
    B. at least one reformer duct extending axially in the burner gas region, the duct including an axially extending reformer chamber substantially filled with catalyst, a wall bounding the chamber which is exposed to the hot gases of the burner region, the chamber having a first portion extending in said burner cavity and a second portion extending from the first portion in said heat transfer region;
    C. support means adapted to engage a heat shield means for the reformer tube;
    D. heat shield means for the first portion of the reformer duct which includes a plurality of individual segments which extend laterally and longitudinally about the duct which are free to expand and contract with respect to adjacent segments, and which are stacked on the support means to minimize tensile stresses in the segments.

2. An apparatus for reforming a fuel which comprises:
    A. a means for providing heat for an endothermic reaction including a burner gas region having a burner cavity and and a heat transfer region, the means including means for introducing and burning fuel in the burner cavity to produce hot gases and means for exhausting the hot gases from the burner gas region;
    B. at least one reformer duct extending axially in the burner gas region, the duct including an axially extending reformer chamber substantially filled with catalyst, a wall bounding the chamber which is exposed to the hot gases of the burner region, the chamber having a first portion extending in said burner cavity and a second portion extending from the first portion in said heat transfer region, and the reformer tube including a support means which is adapted to engage a heat shield means for the reformer tube;
    C. heat shield means for the first portion of the reformer duct including
        a plurality of rings stacked one upon the other, each extending circumferentially about the reformer duct and spaced from the reformer duct leaving a lateral gap therebetween, the bottom ring of the plurality of rings resting on the support means such that the bottom ring is supported in a way which does not increase tensile stresses in the ring, the remaining rings of the stack resting on the next lower ring, each of said rings being formed of a plurality of circumferentially extending segments, each segment being spaced circumferentially from the adjacent segment leaving a circumferential gap therebetween;

wherein stacking the rings provides support for the rings without tensile stress and wherein the rings are stacked in staggered fashion such that the circumferential gaps of adjacent rings are not aligned.

3. The apparatus for reforming a fuel of claims 1 or 2 wherein the heat shield means includes a cap which covers the top ring to shield the top of the reformer duct.

4. The apparatus for reforming a fuel of claim 3 wherein the heat shield means is made of a ceramic insulating material.

5. The apparatus for reforming a fuel of claim 4 wherein the ceramic material is dense cast aluminum oxide.

6. The apparatus for reforming a fuel of claim 4 wherein the ceramic material is dense cast zirconium oxide.

7. An apparatus for reforming a fuel which comprises:

A. a means for providing heat for an endothermic reaction including a burner gas region having a burner cavity and a heat transfer region, the means including means for introducing and burning fuel in the burner cavity to produce hot gases and means for exhausting the hot gases from the burner gas region;

B. a plurality of reformer tubes extending axially in the burner gas region, each reformer tube including an axially extending reformer chamber substantially filled with catalyst, a wall bounding the chamber which is exposed to the hot gases of the burner region, the chamber having a first portion extending in said burner cavity and a second portion extending from the first portion in said heat transfer region, and the reformer tube including a support means which is adapted to engage a heat shield means for the reformer tube, the support means including a platform extending axially and radially from the reformer tube;

C. heat shield means for the first portion of at least one of the reformer tubes which is made from an insulating material, the shield means including a plurality of rings stacked one upon the other to form a stack, each extending circumferentially about the reformer tube and spaced radially from the reformer tube leaving a radial gap therebetween, the bottom ring of the stack resting upon the platform of the support means and each of the remaining rings of the stack resting on the next lower ring, each of said rings being formed of a plurality of circumferentially extending segments, each segment being spaced circumferentially from the adjacent segment leaving a circumferential gap therebetween, at least one of the rings having a pair of segments having facing ends, one of the ends having a V-shaped indentation in the end and the other segment having a V-shaped projection in the end which extends into the V-shaped indentation past the end of the adjacent segment leaving a circumferential gap therebetween which does not extend radially between the segments of the ring, and, at least one projection on each segment which engages the axially adjacent ring, the projection axially spacing the adjacent ring from the segment, the projection having a cone shaped locating dimple which engages a cone shaped locating recess in the adjacent ring;

wherein stacking the rings provides support for the rings without tensile stress and wherein the rings are stacked in staggered fashion such that the circumferential gaps of adjacent rings are not aligned.

8. The apparatus for reforming a fuel of claim 7 wherein the heat shield means includes a cap which covers the top ring to shield the top of the reformer tube.

9. The apparatus for reforming a fuel of claim 8 wherein the heat shield means is made of a ceramic insulating material.

10. The apparatus for reforming a fuel of claim 9 wherein the ceramic material is dense cast aluminum oxide.

11. The apparatus for reforming a fuel of claim 9 wherein the ceramic material is dense cast zirconium oxide.

* * * * *